United States Patent [19]

Napolitano

[11] Patent Number: 4,899,740
[45] Date of Patent: Feb. 13, 1990

[54] RESPIRATOR SYSTEM FOR USE WITH A HOOD OR FACE MASK

[75] Inventor: Michael L. Napolitano, Georgetown, Ky.

[73] Assignee: E. D. Bullard Company, Sausalito, Calif.

[21] Appl. No.: 296,938

[22] Filed: Jan. 17, 1989

[51] Int. Cl.$^4$ ............................................. A61M 15/00
[52] U.S. Cl. ......................... 128/202.22; 128/205.23; 128/204.21; 128/205.12; 116/268; 116/70; 137/81.1; 137/908
[58] Field of Search ...................... 128/202.22, 206.15, 128/205.23, 204.18, 205.24, 204.29, 204.26, 204.21, 205.12, 206.28, 206.29; 137/81.1, DIG. 908; 73/861.42; 116/264, 268, 70

[56] References Cited

U.S. PATENT DOCUMENTS

| | | | |
|---|---|---|---|
| 3,224,409 | 12/1965 | Fenger et al. | 128/202.22 |
| 3,508,542 | 4/1970 | Browner | 128/202.22 |
| 3,785,333 | 1/1974 | Warncue et al. | 116/70 |
| 3,811,400 | 5/1974 | Smilg | 116/70 |
| 4,127,122 | 11/1978 | Kienhofer et al. | 128/202.22 |
| 4,250,876 | 2/1981 | Kranz | 128/202.22 |
| 4,275,723 | 6/1981 | Warncue et al. | 128/202.22 |
| 4,430,995 | 2/1984 | Hilton | 128/204.21 |
| 4,498,471 | 2/1985 | Kranz et al. | 128/204.26 |
| 4,499,914 | 2/1985 | Schebler | 137/81.1 |
| 4,674,492 | 6/1987 | Niemeyer | 128/202.22 |
| 4,765,326 | 8/1988 | Pieper | 128/202.22 |

*Primary Examiner*—Eugene H. Eickholt
*Attorney, Agent, or Firm*—Maurice L. Miller, Jr.

[57] ABSTRACT

A portable respirator system for supplying clean, breathable air to a hood or face mask is disclosed. The system can be carried on a waist belt and includes a housing containing air inlet and outlet plenums, and a battery powered, electric motor operated blower connected between the inlet and outlet plenums. The motor can be manually switched between high and low speed operation to supply high quantities of air upon demand caused by high respiration rate and otherwise supply lower quantities of air sufficient for low respiration rates to extend battery life between rechargings. A differential air pressure sensing switch is responsively connected for actuation when the difference between air pressure in the outlet plenum and the pressure of ambient atmosphere is less than a preselected value. A battery powered audible alarm sounds upon actuation of the switch to alert the user to the approach of potentially dangerously low air pressure in the outlet plenum and, consequently, in the mask or hood so that appropriate corrective action can be taken. The housing contains a dividing wall therein which is spaced from a front cover which partially defines the air inlet plenum. The system can be operated in either a powered air purifying respirator mode or a supplied air respirator mode.

17 Claims, 5 Drawing Sheets

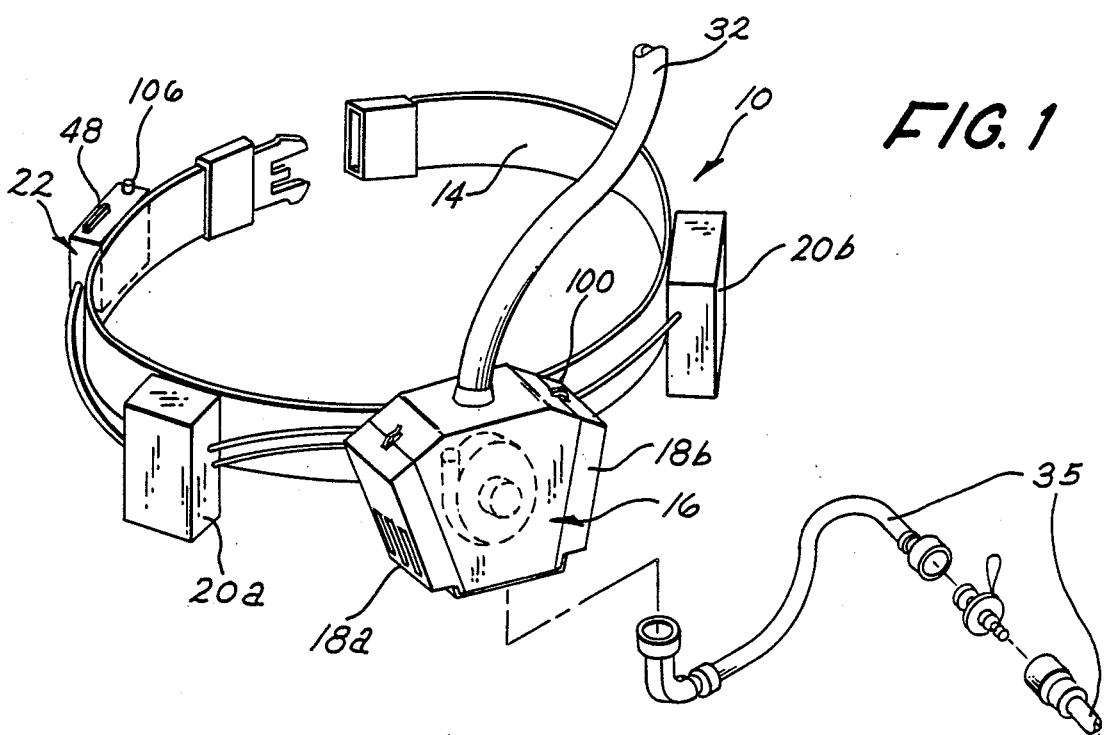
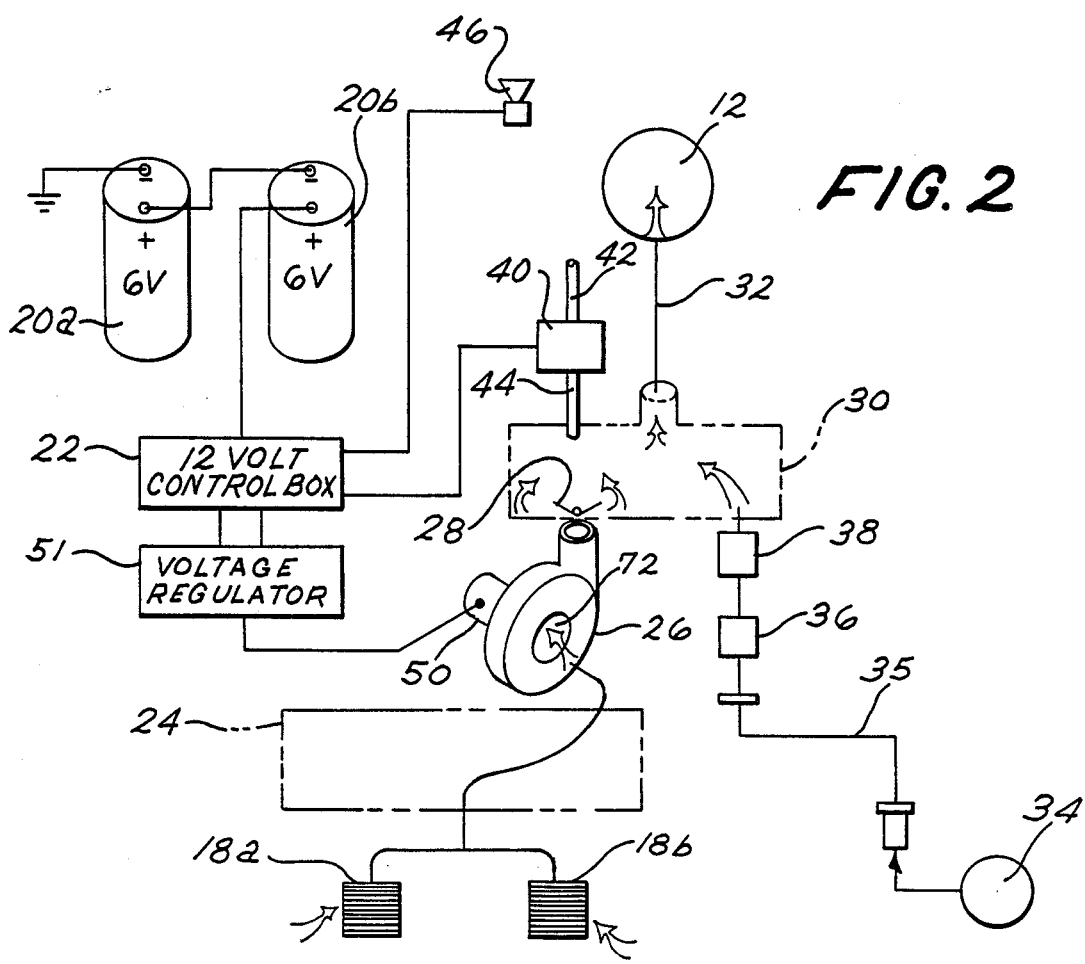

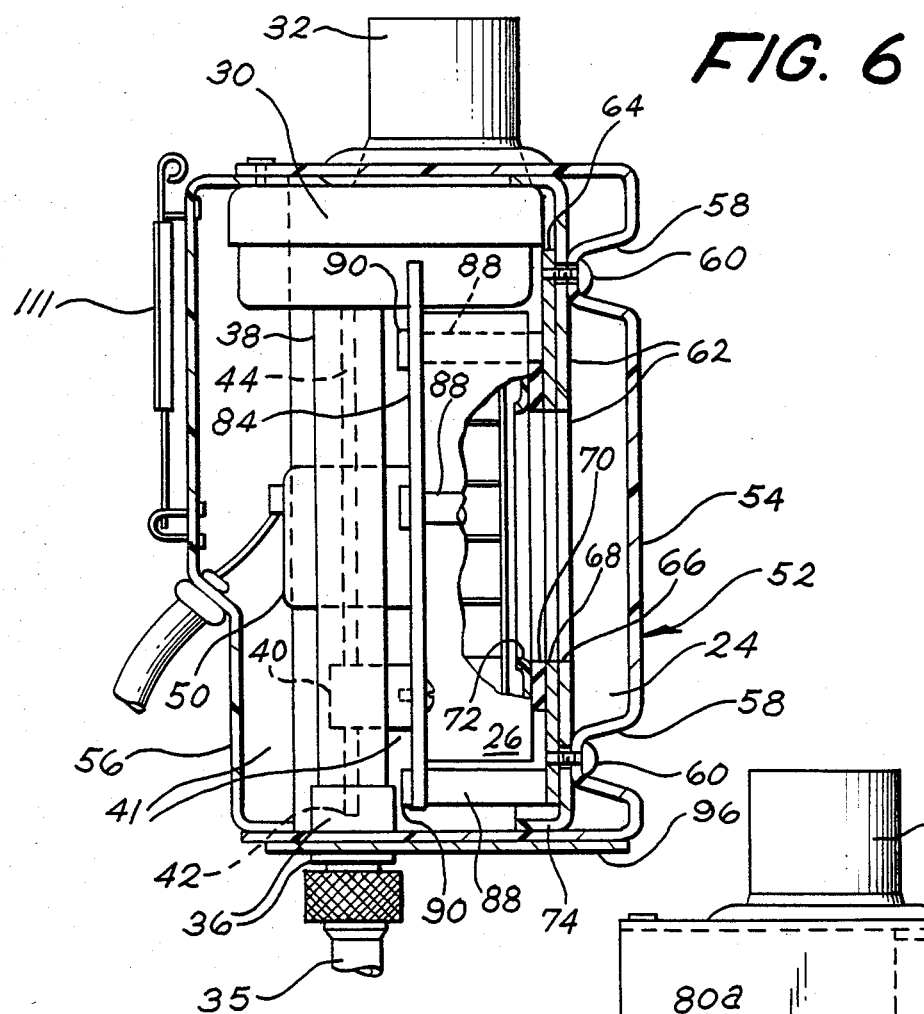
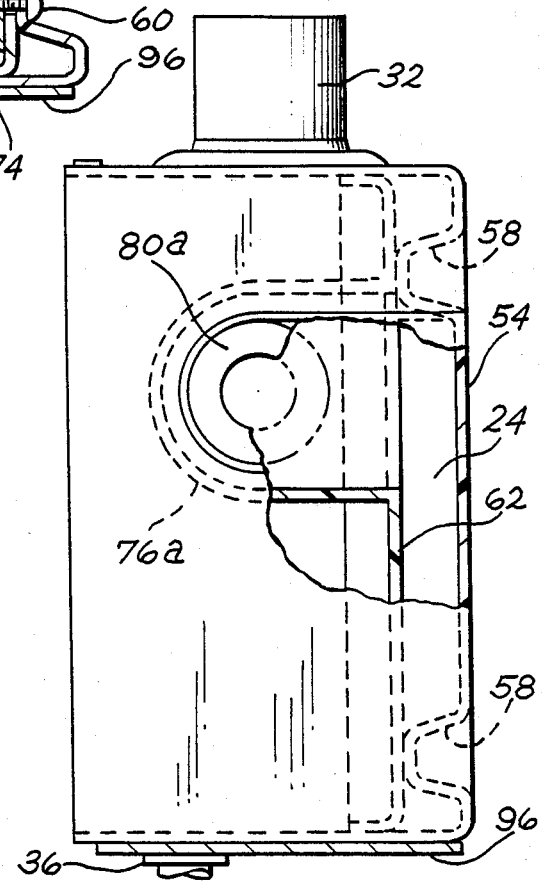
FIG. 6
FIG. 7

RESPIRATOR SYSTEM FOR USE WITH A HOOD OR FACE MASK

BACKGROUND OF THE INVENTION

This invention relates generally to portable respirator assemblies for supplying clean, breathable air to a worker's hood or face mask.

Generally speaking, such portable respirator assemblies have been known and used in the prior art. See, for example the portable back pack which contains a powered air purifying respirator as disclosed in J. R. Hilton U.S. Pat. No. 4,430,995 issued on Feb. 14, 1984. That assembly contains a pair of air filters connected to the inlet ports of an electric motor driven blower. The blower supplies filtered air from ambient surroundings to a collapsible/expandable bag which, in turn, supplies such air through a one-way valve and flexible air line to a worker's face mask. One end of the air bag is mounted against a back frame support and the other end of the bag, which expands and contracts, operates a spring biased arm to change the setting of a potentiometer which, in turn, changes the voltage applied by a battery to the blower motor so as to decrease the blower speed as the bag inflates and expands, and to increase the blower speed as the bag deflates and contracts. To prevent overinflation of the bag, the arm contacts a mechanical stop at the outer limit of bag expansion which throws a microswitch to cut off the power supply to the motor and stop the blower. One problem encountered with the subject assembly is its large size requiring that it be carried in a back frame attached to the back of the user. Another problem with this assembly is the fact that the blower speed continually changes during inhalation of the user, at least up to the point of blower cutoff at full bag expansion. Yet another problem of the subject assembly is that the blower speed is not subject to manual control by the user independent of his or her inhalation.

Another feature of certain prior art respirator systems is that of an audible low pressure alarm for warning the wearer of low air pressure in or supplied to a face mask or hood. See, for example, M. L. Kranz U.S. Pat. No. 4,250,876 issued on Feb. 17, 1981, M.L. Kranz et al. U.S. Pat. No. 4,498,471 issued on Feb. 12, 1985, T. A. Niemeyer U.S. Pat. No. 4,674,492 issued on June 23, 1987 and N. Fenger et al. U.S. Pat. No. 3,224,409 issued on Dec. 21, 1965. All of these low pressure alarms, however, are air operated whistles which must be used in conjunction with a source of compressed air which lend themselves to use with supplied air respirator systems. The reference alarm devices are not shown or described as being applicable to respirator systems operated in a powered air purifying respirator mode absent the use of an alarm operating compressed air source.

The respirator system of my invention overcomes these and other difficulties encountered in the prior art and provides an extremely compact assembly capable of being carried on the back of the user's waist belt.

SUMMARY OF THE INVENTION

It is an object of the present invention to provide a novel powered air purifying respirator system for supplying filtered breathable air from ambient surroundings to a respirator hood or face mask.

It is a further object of the present invention to provide a combination powered air purifying respirator and supplied air respirator system for supplying clean, breathable air from either ambient surroundings or from a source of compressed air to a respirator hood or face mask.

It is yet another object of the invention to provide a respirator system for use with a hood or face mask which contains a blower/motor assembly capable of operation at two different speeds for providing a low air flow rate to said hood or mask at normal user respiration rates and for providing a high air flow rate to said hood or mask at high user respiration rates.

Briefly, in accordance with the present invention, there is provided a respirator system for supplying breathable air to a hood or face mask which includes a housing containing a first chamber defining a component cavity and an air inlet plenum. An air filter means is removably connectable to the housing for removing contaminants from ambient air passing therethrough, the filter means being in fluid communication with ambient atmosphere external to the housing and with the air inlet plenum. A blower means is disposed in the component cavity and contains an air inlet port communicating with the air inlet plenum and an air outlet port. A motor is disposed in the component cavity and is operatively connected to the blower means. An air outlet plenum is also disposed in the component cavity and is connected in fluid receiving relation to the blower outlet port. The air outlet plenum is connectable in air supplying relation to the hood or face mask for operation of the system in a powered air purifying respirator mode. Valve means is connected between the blower air outlet port and the air outlet plenum for permitting air under pressure, to flow from the blower means to the air outlet plenum and for preventing air under pressure, from escaping the air outlet plenum into the blower outlet port. A differential air pressure sensing means is connected in fluid responsive relation between ambient atmosphere and the air outlet plenum for sensing when the difference between the pressure of the air in the air outlet plenum and the pressure of ambient atmosphere is less than a preselected minimum value. Alarm means is provided which is responsively connected to the sensing means for indicating when the pressure difference is less than the preselected value.

These and other objects, features and advantages of the present invention will become apparent to those skilled in the art from the following detailed description and attached drawings upon which, by way of example, only one preferred embodiment of the present invention is illustrated.

BRIEF DESCRIPTION OF THE DRAWINGS

FIG. 1 shows a perspective view of a worker's belt carried respirator system for use with a face mask or hood, thus illustrating one preferred embodiment of the present invention.

FIG. 2 shows an operational schematic diagram of the respirator system of FIG. 1.

FIG. 6 shows a cross-sectional side elevation view of the blower housing of FIGS. 1 and 3-5 as viewed along crosssection lines 6—6 of FIG. 4.

FIG. 7 shows a full side elevation view of the blower housing of FIGS. 1 and 3-6 as viewed from the same direction as in FIG. 6 with a back cover removed and with a portion of the side surface torn away.

DESCRIPTION OF THE PREFERRED EMBODIMENT

Figure 3:
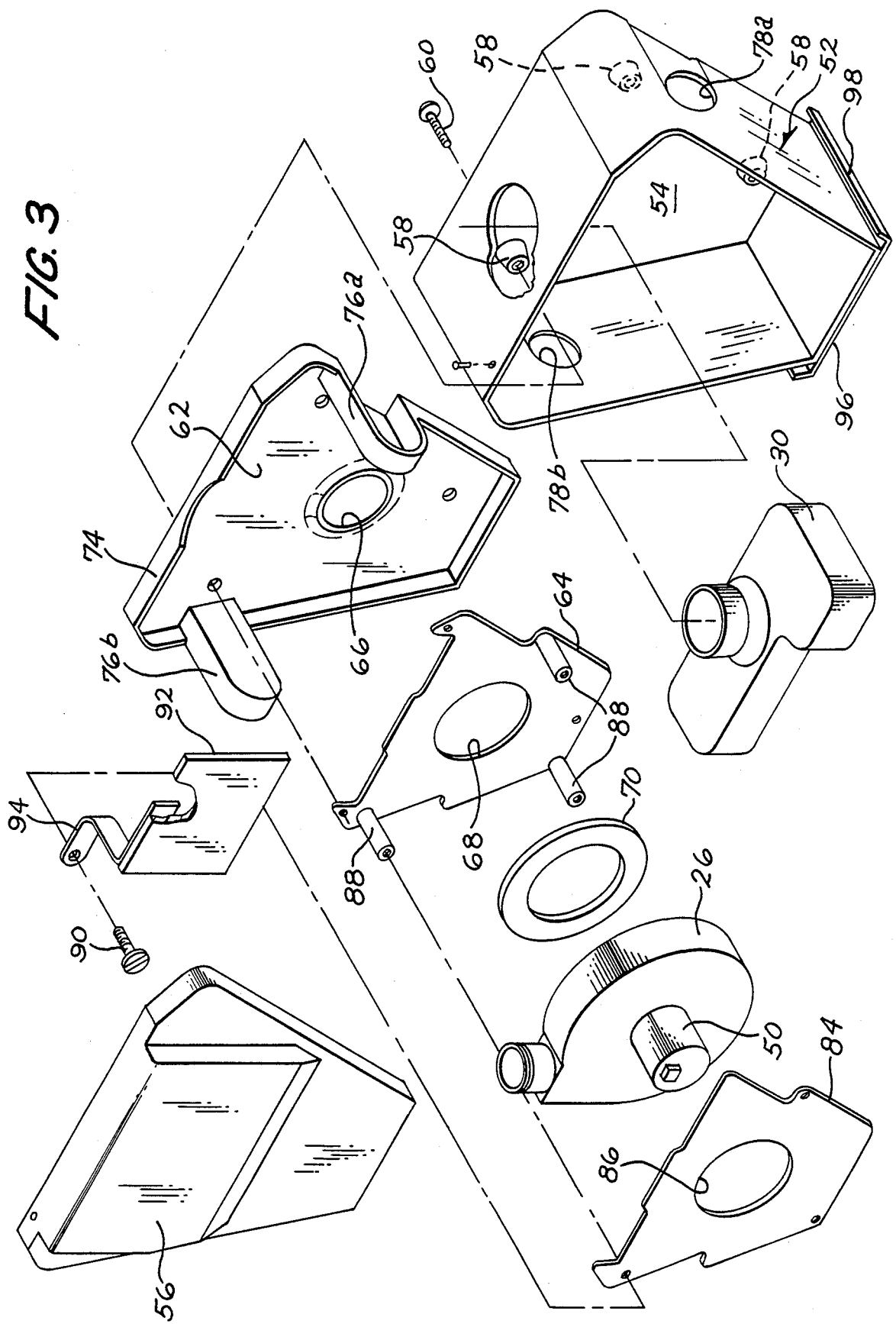
FIG. 3 shows an exploded perspective view of a portion of the system of FIG. 1, specifically, a blower housing and certain components connected thereto.

Referring now to FIGS. 1-2 of the drawings there is shown, in one preferred embodiment of my invention, a worker's waist belt carried respirator system 10 adapted for supplying clean, breathable air to a hood or face mask of any type suitable for wearing by the worker in a contaminated atmospheric working environment as generally designated at 12 in FIG. 2. The system 10 is adapted to fit conveniently along and around a waist belt 14 and includes a blower housing 16, a pair of air filters 18a and 18b removably attached to opposite sides of the housing 16, a pair of 6 volt batteries 20a and 20b and a control box 22. The system 10 is adapted to operate in either one of two selectable modes, one being a powered air purifying respirator or PAPR mode, and the other being a supplied air respirator or SAR mode.

Referring now also to FIGS. 3-7 and when the system 10 is operated in the PAPR mode, ambient air is drawn into the system 10 through the filters 18a and 18b, thence into and through an inlet air plenum chamber 24 into an air compressor or blower 26 from whence it is directed, under pressure, through a conventional flapper valve 28 into an air outlet plenum 30 and, finally, through a flexible air hose or line 32 to the hood or mask 12. When operating in the SAR mode, clean breathable air is supplied from a suitable compressed air tank or other source 34 (FIG. 2 only) through a flexible air hose or line 35, one-way check valve 36 and muffler pipe 38 into the outlet air plenum 30, from whence it flows through the line 32 to the hood or mask 12. When the system 10 is operating in the SAR mode, compressed air introduced into the outlet plenum 30 from the source 34 causes the flapper valve 28 to close and remain closed so that such air cannot escape the outlet plenum 30 and back up into the blower 26. Similarly, when the system 10 operates in the PAPR mode, air introduced into the outlet plenum 30 through the flapper valve 28 cannot pass out of the outlet plenum 30 an muffler pipe 38 through the check valve 36.

Figure 9:
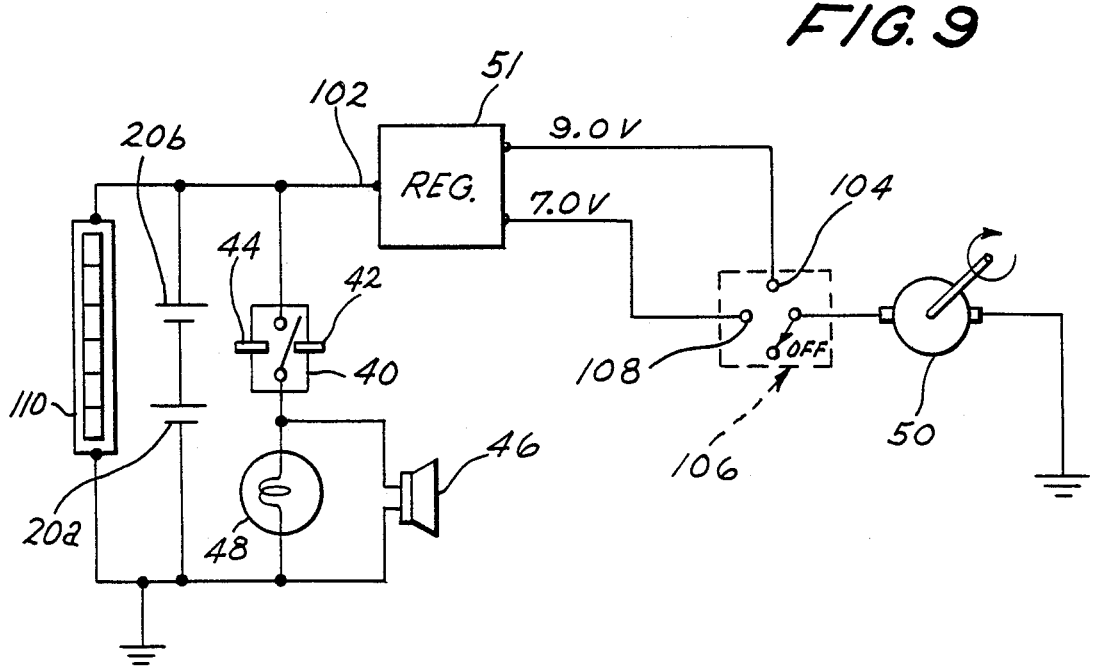
FIG. 9 shows a schematic diagram of an electrical circuit of the respirator system of FIGS. 1-2.

Referring also to FIG. 9, the importance of maintaining an air pressure in the mask or hood 12 which is at least slightly above or positive with respect to ambient air pressure at all times in order to avoid leakage of contaminated air into the mask or hood 12 cannot be overstated. Thus it is important to provide means for sensing occasions when the air pressure in the hood or face mask 12 is reduced to a level which may be approaching dangerously close to that of the ambient atmospheric pressuring in the surrounding environment. This is accomplished in the present example by means of a conventional differential air pressure sensing switch 40 located in the housing 16 in a component cavity 41 (See FIG. 6) and positioned behind the inlet air plenum 24, which switch communicates through an air line 42 with ambient atmosphere and through an air line 44 with the air circulating through the outlet plenum 30. The switch 40 is preset so as to activate a buzzer 46 and warning light 48 on the control box 22 (see FIG. 9) at any time the air pressure in the outlet plenum 30 falls to a preselected minimum value above the pressure of ambient atmosphere in the surrounding work environment. Since the component cavity 41 is not air tight, the ambient air pressure sensing line 42 may sample air pressure within the component cavity 41 as shown, which air pressure will be essentially the same as the pressure of ambient atmosphere immediately external to the housing 16. In this manner, the worker will be alerted to the potential danger so that appropriate corrective action can be taken including adjustment of the face mask to eliminate a defective seal producing a leak, increasing the speed of the blower 26 to compensate for heavy respiration or reduced battery voltage when operating the system 10 in the PAPR mode, increasing the flow of compressed air from the source 34 to compensate for heavy respiration when operating the system 10 in the SAR mode, or exiting the work environment.

The blower 26 is driven by a d.c. electric motor 50 capable of being operated at two different speeds depending upon whether it receives either a 9.0 volt d.c. potential or 7.0 volt d.c. potential from a voltage regulator 51, which regulator is, in turn, supplied with a maximum 12.0 volt d.c. potential from the series connected batteries 20a and 20b. For light work and low breathing rates, the worker may set the potential on the blower motor 50 at 7.0 volts in order to save the batteries 20a and 20b and thus extend the time between recharging and, as a consequence, extend his or her time in the work environment. Then, as the level of work is increased requiring increased respiration, the worker can shift to high speed blower operation when and if the alarms 46 and 48 so indicate and, thereafter, return the blower motor 50 to low speed operation to reduce the discharge rate of the batteries 20a and 20b should his work and breathing rates decrease to a level wherein the blower 26 can maintain the desired minimum air pressure in the outlet plenum 30 and hood or mask 12 while operating at low speed.

Referring now specifically to FIGS. 3-7, the details of construction of the blower housing 16 and its interior components will now be explained. The housing 16 includes a generally trapezoidally shaped member 52 having sidewalls, a front surface 54, top and bottom surfaces and a removable rear cover 56. The front surface 54 contains three conically shaped inwardly extending depressions 58 into which screws 60 are inserted to secure a back inlet plenum chamber defining wall 62 and a front blower mounting plate 64 thereto. The depressions 58 provide spacing between the broad flat portion of the front surface 54 and the wall 62 and thus define the width of the inlet plenum chamber 24. The wall 62 and plate 64 define circular openings 66 and 68, respectively (See FIGS. 3 and 6), which register with one one another. A circular gasket 70 is disposed around an air inlet port 72 of the blower 26 and is glued to the front face of the blower to isolate the blower inlet port 72 for communication only with the inlet plenum chamber 24 by way of the openings 66 and 68.

Figure 4:
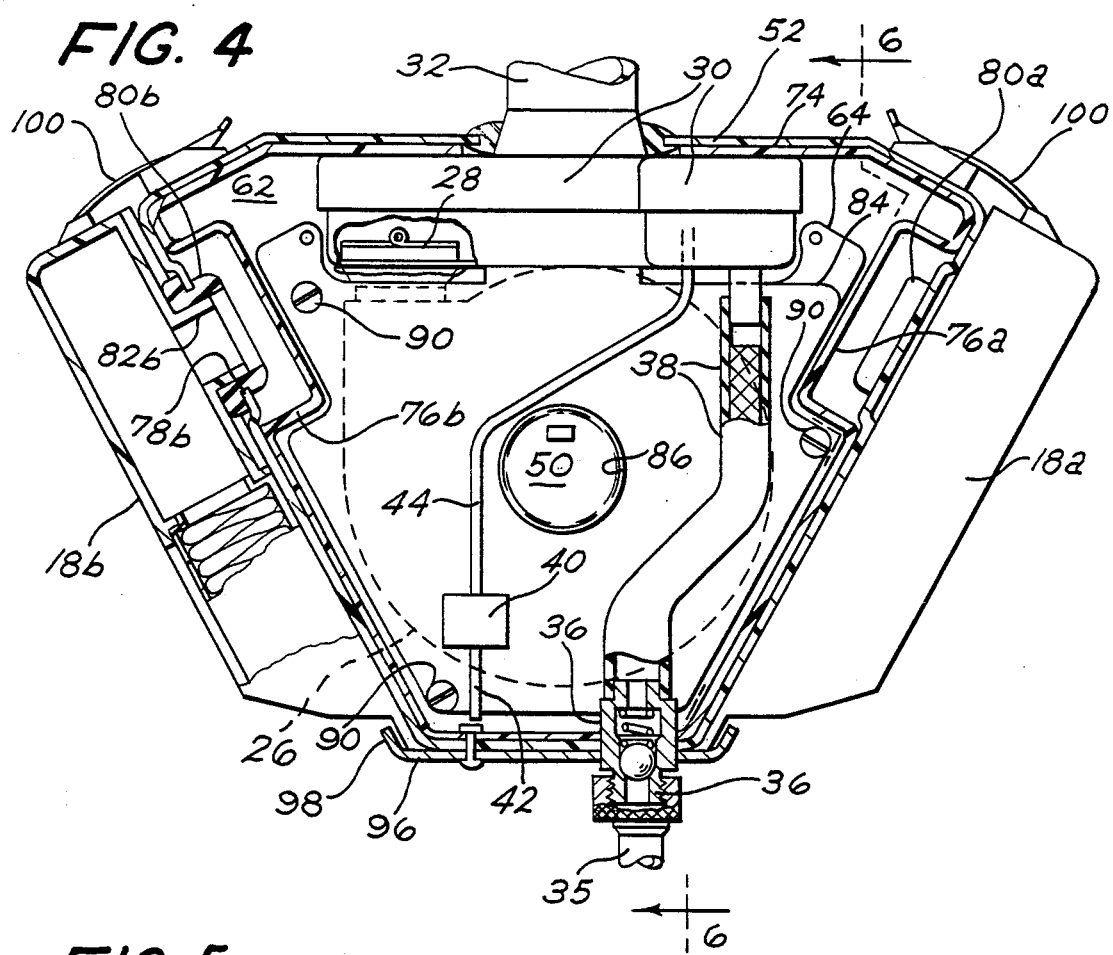
FIG. 4 shows a rear elevation view of the blower housing of FIGS. 1 and 3 with detachable side mounted air filters, a back cover of the blower housing being torn away to permit viewing of components in the interior thereof.
Figure 5:
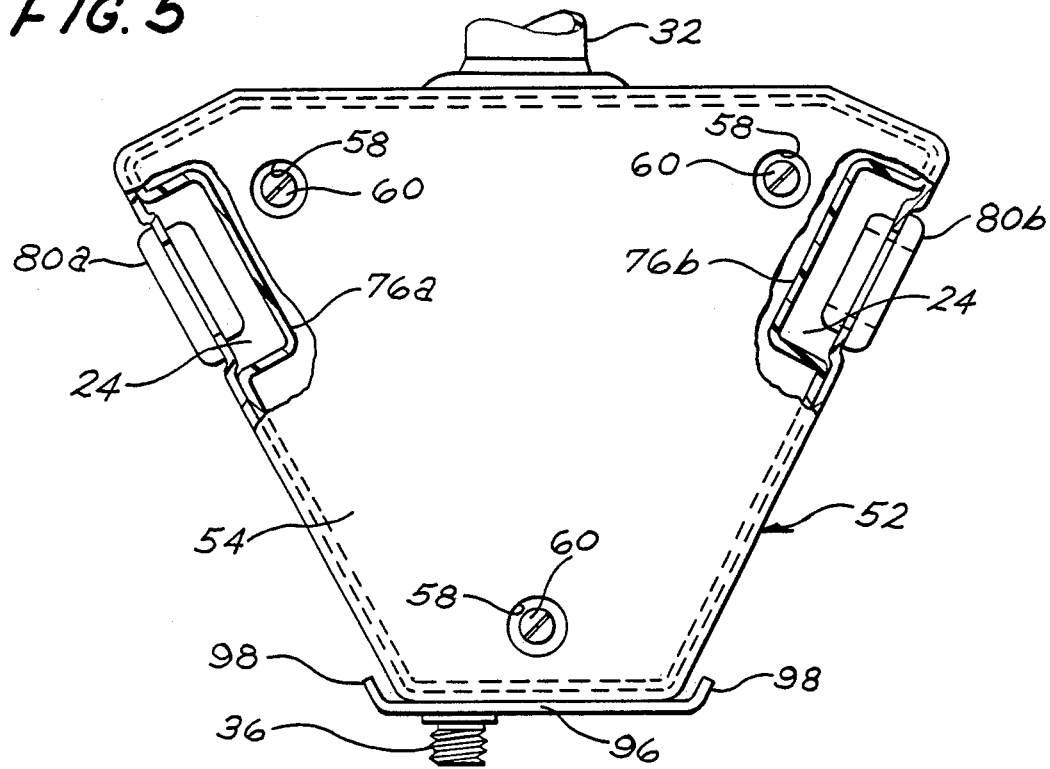
FIG. 5 shows a front elevation view of the blower housing of FIGS. 1 and 3-4 with the air filters removed and with portions of a front cover torn away.

The wall 62 is also trapezoidally shaped and contains a rearwardly extending ledge or flange 74 which closely conforms to the interior surface of the member 52. The ledge 74 is interrupted on opposite upper sides by a pair of rearwardly projecting ears 76a and 76b which provide closed air passages between a pair of circular openings 78a and 78b located in upper side walls of the member 52 and the inlet air plenum chamber 24. The openings 78a and 78b contain rubber or plastic grommets 80a and 80b into which cylindrically shaped outlet ports 82a and b of the filters 18a and 18b project when the latter are connected to the sides of the member 52 (See FIG. 4 showing port 82b). A rear blower cover plate 84 containing a circular opening 86 fits against the back of the blower 26 such that the motor 50 projects rearwardly through the opening 86 toward the rear cover 56. Three cylindrically shaped spacers 88 stabilize the front and rear cover plates 64 and 84. The plates 64 and 84 are secured together by screws 90 which project through the spacers 88. The differential air pressure sensing switch 40 and its rigid air lines 42 and 44 are disposed in the component cavity 41 behind the blower 26 and blower rear cover plate 84 alongside the muffler pipe 38. A circuit board 92 (See FIG. 3) containing circuitry for the voltage regulator 51 is also disposed behind the blower rear cover plate 84 and is connected by means of an L-shaped bracket 94 and one of the screws 90 to the upper left hand corner of the plate 84 as viewed. The circuit board 92 and bracket 94 have been removed from the upper lefthand screw 90 of FIG. 4 for clarity. A filter support plate 96 is connected to the lower surface of the member 52 and contains upwardly turned side edge portions 98. Base edge portions of the filters 18a and 18b insert between the upwardly turned edge portions 98 and lower side edge portions of the member 52 after which the outlet ports 82a and 82b of the filters 18a and 18b are frictional fitted into the grommets 80a and 80b as best seen in FIG. 4. Conventional latches 100 located on upper side edge portions of the member 52 secure the filters in place on the member 52.

To protect the inlet plenum chamber 24 from contamination by lubricants from the blower 26 and motor 50, the latter two components should be carefully coated with a suitable sealant after being joined together and prior to installation in the housing 16. I recommend using an industrial grade vinyl coating such as PC-84 available from Mocap, Inc., 4605 McRee Avenue, St. Louis, MO 63110 or the equivalent. The blower 26 and motor 50 should be dunked into the coating solution and twisted and turned so that all exposed surfaces are coated. Care should be taken during the dunking process to keep the coating from entering the blower inlet and outlet air ports or covering the motor electrical contacts. Thereafter, the blower/motor assembly should be hanged until dried. The ledges 74 of the wall 62 and the outer edges of the ears 76a and 76b should be glued to the interior surfaces of the member 52 to provide an air tight seal for the chamber 24. The gasket 70 may be made of any suitable compressible, resilient material such as, for example, a Neoprene or Polyurethane plastic or the like and should be glued to the face of the blower 26 around the air inlet port 72 to provide an air tight seal between the inlet port 72 and the air inlet plenum 24. The differential air pressure sensing switch 40 may be of any suitable type such as the model MPL-501 pressure differential switch as manufactured by and available from Micro Pneumatic Logic, Inc., 2890 N.W. 62nd Street, Fort Lauderdale, FL 33309.

The blower 26 and motor 50 may be a Model No. 19A2939 as manufactured by Globe Motor Division of Labinal Components and Systems, Inc. of 2275 Stanley Avenue, Dayton, OH or other suitable type. The voltage regulator 51 may be of any suitable type for supplying either 9.0 volts regulated d.c. or 7.0 volts regulated d.c. as desired to the motor 50 such as a model No. 644890 as manufactured by Safeco Incorporated, 6060 Northwest Highway, Chicago, IL 60631.

Figure 8:
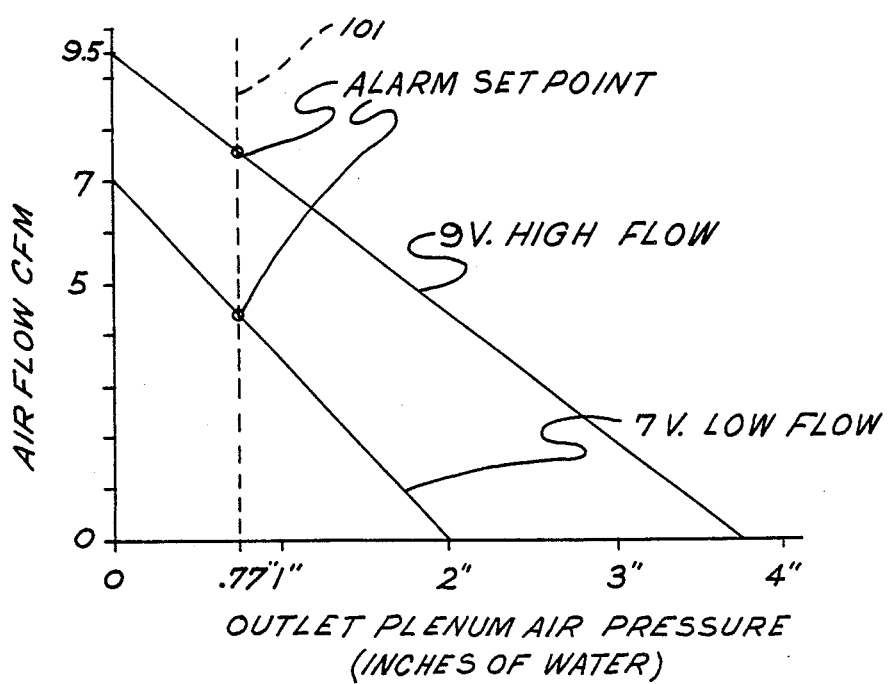
FIG. 8 shows a graph of blower outlet air flow in cubic feet per minute versus outlet plenum air pressure in inches of water for two different blower motor input voltage levels, typical of the dynamic operating characteristics of the respirator system of FIGS. 1-2.

Referring now to FIG. 8, the dynamic operating characteristics of the system 10 are shown for operation in the PAPR mode at input voltages of 9.0 volts and 7.0 volts to the motor 50. It is desired to actuate the sensing switch 40 to operate the audible alarm 46 when air pressure in the mask or hood 12 is at 0.22 inches of water in access of ambient atmospheric pressure. Because the switch 40 senses pressure differences between ambient atmosphere in the component cavity 41 and air in the outlet plenum 30, it is necessary to set the triggering level of the switch 40 at a somewhat higher pressure differential such as 0.77 inches of water as shown on the graph of FIG. 8 at 101.

Referring now also to the circuit diagram of FIG. 9, there is shown the regulator 51 having up to 12 volts supplied to its input terminal 102 from the series connected batteries 20a and 20b. The regulator 51 supplies a regulated maximum 9.0 volt d.c. potential to a terminal 104 of a three-position switch 106 (See also FIG. 1) and a regulated maximum 7.0 volt d.c. potential to a terminal 108 of the switch. A common switch arm terminal of the switch 106 is connected to one input terminal of the motor 50 and the switch arm is shown connected to an isolated terminal designated as the "OFF" position. The operator can run the motor 50 at low speed for low blower air flow by adjusting the switch arm of the switch 106 to the terminal 108 and thereafter obtain high motor speed for high blower air flow by switching the arm to the terminal 104. The pressure differential sensing switch 40 closes to activate the warning buzzer 46 and light 48 as previously explained. A suitable visual battery discharge light 110 is connected across the batteries 20a and 20b to alert the user as to battery discharge status.

Those skilled in the art will appreciate that the flapper valve 28 can be eliminated by placing a one-way check valve of a type such as the valve 36 at the downstream end of the pipe 38 at the entrance to the outlet plenum 30 and by running an air line from the outlet port of the blower 26 to an inlet end of the check valve so that both high pressure air from the blower 26, when the system 10 is operated in the PAPR mode, and compressed air from the remote source 34, when the system 10 is operated in the SAR mode, will enter the outlet plenum 30 through the same check valve. In such an arrangement, of course, the opening in the outlet plenum 30 presently covered by the flapper valve 28 would also be eliminated and the upstream end of the pipe 38 should be sealed with a suitable air tight cap prior to and during use of the system 10 in the PAPR mode.

The back cover 56 may contain suitable fastening means for removably attaching the housing 16 to the belt 14 such as a pair of conventional clasps 111, one of which is shown in FIG. 6. The belt 14 fits in the narrow space between the clasps 111 and the back cover 56 and the clasps 111 of the present example may be opened or closed by pulling upwardly or pushing downwardly on the upper curled end thereof. The housing 16 is preferably worn on the belt 14 on the back of the user where it will be out of the way when the user is performing various tasks.

Although the present invention has been described with respect to specific details of a certain preferred embodiment thereof, it is not intended that such details limit the scope of this patent other than as specifically set forth in the following claims.

I claim:

1. A respirator system for supplying breathable air to a hood or face mask comprising a housing containing a first chamber defining a component cavity, an air inlet plenum disposed in said housing, air filter means removably connectable to said housing for removing contaminants from ambient air passing therethrough, said air filter means communicating with ambient atmosphere external to said housing and with said air inlet plenum, blower means disposed in said component cavity and having an air inlet port and an air outlet port, said air inlet port communicating with said air inlet plenum, a motor disposed in said component cavity and operatively connected to said blower means, an air outlet plenum disposed in said component cavity and connected in fluid receiving relation to said blower air outlet port, said air outlet plenum being connectable in air supplying relation to said hood or mask for operation of the system in a powered air purifying respirator mode, valve means connected between said blower air outlet port and said air outlet plenum for permitting air, under pressure, to flow from said blower means into said air outlet plenum and for preventing air, under pressure, from escaping said air outlet plenum into said blower air outlet port, differential air pressure sensing means connected in fluid responsive relation between ambient atmosphere and said air outlet plenum for sensing when the difference between the pressure of air in said air outlet plenum and the pressure of ambient atmosphere is less than a preselected minimum value, and alarm means responsively connected to said sensing means for indicating when said pressure difference is less than said value.

2. The system of claim 1 wherein said housing is adapted for being carried on a waist belt.

3. The system of claim 1 wherein said housing is generally trapezoidally shaped.

4. The system of claim 1 wherein said air filter means comprises a pair of air filter containing packages removably connectable to opposite side surfaces of said housing, each of said side surfaces defining an opening therethrough for passing filtered air from a different one of said packages into said housing, said system further comprising means for isolating each said opening from said component cavity and for directing filtered air from said packages into said air inlet plenum.

5. The system of claim 1 further comprising means for selectively operating said motor at two different speeds.

6. The system of claim 1 wherein said valve means is also connectable between said air outlet plenum and a source of compressed air which is remote with respect to said housing for operating said system in a supplied air respirator mode, said valve means being adapted to prevent a reverse flow of air therethrough and out of said outlet plenum when said system is operating in said powered air purifying respirator mode.

7. The system of claim 1 wherein said blower means and motor are coated with a sealant to inhibit contaminants from said motor and blower means from entering said air inlet plenum.

8. The system of claim 1 wherein said first valve means is a flapper valve disposed in said air outlet plenum over an end of said blower air outlet port.

9. The system of claim 1 wherein said differential air pressure sensing means comprises a differential air pressure sensing switch.

10. The system of claim 1 wherein said alarm means comprises a buzzer.

11. The system of claim 1 wherein said alarm means comprises a visual alarm.

12. The system of claim 1 further comprising a gasket of compressible material attached to said blower means and disposed around said blower air inlet opening for isolating said component cavity from said air inlet plenum.

13. The system of claim 6 further comprising a muffler pipe disposed in said component cavity, one end of which is connected to said air outlet plenum, the other end of which is connectable to a remote source of compressed air.

14. The system of claim 6 wherein said second valve means comprises a one-way check valve.

15. The system of claim 4 wherein said housing defines integrally connected upper, lower, side and front surfaces, said system further comprising a wall disposed in said housing for dividing said air inlet plenum from said component cavity, said wall being spaced from said front surface, said air inlet plenum being partially defined by said wall and front surface.

16. The system of claim 4 wherein said openings contain grommets.

17. The system of claim 4 containing a pair of air passage members connected between said side surface openings and said air inlet plenum for isolating filtered air entering said side surface openings from said component cavity and for directing said filtered air into said air inlet plenum.

* * * * *